United States Patent [19]
Saito et al.

[11] Patent Number: 5,687,358
[45] Date of Patent: Nov. 11, 1997

[54] ACCELERATOR FOR MOUNTING AND INTERFACING A SECOND CPU ONTO A MOTHERBOARD

[75] Inventors: Shinsuke Saito; Shigeru Katagiri, both of Nagoya, Japan

[73] Assignee: Melco, Inc., Nagoya, Japan

[21] Appl. No.: 607,548

[22] Filed: Feb. 27, 1996

Related U.S. Application Data

[63] Continuation of Ser. No. 284,201, Aug. 2, 1994, abandoned.

[51] Int. Cl.$^6$ ............................................. G06F 1/04
[52] U.S. Cl. ..................... 395/551; 395/555; 395/556
[58] Field of Search ............................... 395/550, 551, 395/552, 555, 556, 558, 559, 560

[56] References Cited

U.S. PATENT DOCUMENTS

| | | | |
|---|---|---|---|
| 4,688,237 | 8/1987 | Brault | 377/48 |
| 5,187,722 | 2/1993 | Petty | 375/118 |
| 5,204,676 | 4/1993 | Herrmann | 341/61 |
| 5,325,490 | 6/1994 | Brasseur | 395/325 |
| 5,347,559 | 9/1994 | Hawkins et al. | 395/550 |
| 5,450,574 | 9/1995 | Madter et al. | 395/550 |
| 5,455,927 | 10/1995 | Huang | 395/500 |
| 5,506,981 | 4/1996 | Madter | 395/550 |

FOREIGN PATENT DOCUMENTS

| | | | |
|---|---|---|---|
| 0142440 | 5/1985 | European Pat. Off. | H03K 5/00 |
| 0551514A1 | 7/1993 | European Pat. Off. | G06F 3/00 |
| 2262415 | 6/1993 | United Kingdom | H04L 7/00 |

OTHER PUBLICATIONS

C't-Magzin fur Computertechnic, 1991, nr. 7 pp. 55-57, Heise GmbH & Co., Hannover, Germany.

IBM Technical Disclosure Bulletin, vol. 33, No. 3B, Aug. 1990 New York US, pp. 112-113.

*Primary Examiner*—Dennis M. Butler
*Attorney, Agent, or Firm*—Hickman Beyer & Weaver

[57] ABSTRACT

The present invention provides an accelerator working in place of a CPU on a motherboard to speed up the processing. The accelerator can realize the high-speed processing even when a clock on the accelerator is not an integral multiple of a clock on the CPU. When a clock frequency of a clock signal CLK on the motherboard is equal to 20 MHz and a maximum frequency of a CPU (3) on an accelerator (100) is equal to 33 MHz, for example, the CPU (3) does not work properly by a doubled clock signal. In such a case, a clock multiplication circuit (3a) multiplies the clock signal CLK by 1.5 times to generate a clock signal CLK15. There are three different patterns in the relationship between the timing of access of the CPU 3 and the timing of access of the motherboard. The accelerator of the invention determines the appropriate timing in each case and allows the access of the CPU 3 to be synchronous with the access of the motherboard.

13 Claims, 8 Drawing Sheets

ACCELERATOR FOR MOUNTING AND INTERFACING A SECOND CPU ONTO A MOTHERBOARD

This is a continuation of application Ser. No. 08/284,201 filed Aug. 2, 1994, now abandoned.

BACKGROUND OF THE INVENTION

1. Field of the Invention

The present invention relates to an accelerator to speed up a computer, and more specifically to an accelerator working in place of a CPU on a motherboard to improve the processing speed.

2. Description of the Related Art

As generally known, an accelerator may be attached to a computer to work in place of a CPU mounted on a motherboard and driven by a predetermined clock frequency (for example, 16 MHz) so as to speed up the processing of the computer. Such an accelerator includes a high-speed CPU (for example, driven by a clock frequency of 48 MHz) working in place of a low-speed CPU on the motherboard to realize the high-speed processing. The accelerator may be attached directly to a CPU socket where the low-speed CPU is originally mounted, or mounted on a socket for an arithmetic processor or an exclusive socket for an accelerator. Such a conventional accelerator, however, only speeds up internal operations of the CPU while substantially not speeding up data exchange between the CPU and a ROM or a RAM on the motherboard operated at a low speed. Improved accelerators have been proposed for speeding up the whole processing. Examples of the improved accelerators include those that mount a high-speed memory and have a cache memory inside the CPU to reduce the number of accesses to a low-speed element.

For the access of the CPU on the accelerator to memories on the motherboard, the accelerator should be driven by a clock synchronous with read and write control signals and can not be driven by a clock independent of a reference clock on the motherboard. The accelerator accordingly includes an integral multiple clock circuit for multiplying a clock frequency on the motherboard by an integral value, a CPU driven by the integral-multiplied clock frequency and including a cache memory, and a timing circuit for making a timing of a control signal output from the CPU to a logic circuit on the motherboard synchronous with a timing of a signal output from the logic circuit to the CPU.

The timing circuit adjusts the timing when the CPU driven by a high clock frequency reads data out of a ROM or RAM driven by a low clock frequency. Rise and fall of a clock signal having a low clock frequency always correspond to rise and fall of another clock signal having a high clock frequency determined by multiplying the low clock frequency by an integral value. Data are read at the timing of the low clock frequency based on the above relationship. The timing circuit accordingly detects a rise of the clock signal having the low clock frequency.

The CPU of the accelerator generally includes a cache memory of several kilobytes to reduce data exchange between the CPU and logic circuits driven by a low clock frequency so as to remarkably speed up the processing. Since programs executed by the CPU in a predetermined time period generally exist in a narrow memory area, the cache memory of several kilobytes on the accelerator reduces the number of access of the CPU to the logic circuits to less than one tenth. Data exchange between the CPU and the cache memory is implemented at the high clock frequency of the CPU. The cache memory in the CPU thus significantly speeds up the processing of the whole computer system even when the computer includes a ROM and a RAM driven only by a low clock frequency.

These accelerators are, however, applicable only to integral-multiplied clock frequencies. For example, when a CPU driven by a clock frequency of 20 MHz is replaced by a CPU which can be driven by a maximum clock frequency of 50 MHz, the new CPU can not work at a speed of 60 MHz which is three times the frequency 20 MHz but works only at a speed of 40 MHz which is twice the frequency 20 MHz. In another example, when a CPU working at the speed of 20 MHz is replaced by a CPU driven by a clock frequency of 33 MHz, the new CPU can not work at the speed of 40 MHz which is twice the frequency 20 MHz, thereby not realizing the high-speed processing.

SUMMARY OF THE INVENTION

The object of the invention is accordingly to speed up the processing of a computer even when a clock on an accelerator is not an integral multiple of a clock on a CPU.

The invention is directed to an accelerator mounting a second CPU used in place of a first CPU on a motherboard. The accelerator further comprises:

clock signal output means for generating a second clock signal by multiplying a first clock signal output to the first CPU by a non-integral value, and outputting the second clock signal to the second CPU; and timing signal generating means for generating a timing signal for access of the second CPU in response to each synchronous combination of the first clock signal and the second clock signal.

The accelerator of the invention thus constructed mounts the second CUP, which works in place of the first CPU on the motherboard. The second CPU is driven by the second clock signal generated by multiplying the first clock signal output to the first CPU by a non-integral value. Since the second clock signal is not an integral multiple of the first clock signal, the second CPU is not directly accessible to another device on the motherboard. The timing signal generating means thus generates a timing signal for access of the second CPU in response to each synchronous combination of the first and second clock signals. The second CPU realizes the access to another device on the motherboard with the timing signal.

These and other objects, features, aspects, and advantages of the present invention will become more apparent from the following detailed description of the preferred embodiment with the accompanying drawings.

BRIEF DESCRIPTION OF THE DRAWINGS

FIG. 6 is a timing chart showing the timing of each element in the clock multiplication circuit 3a;

DESCRIPTION OF THE PREFERRED EMBODIMENT

Figure 1:
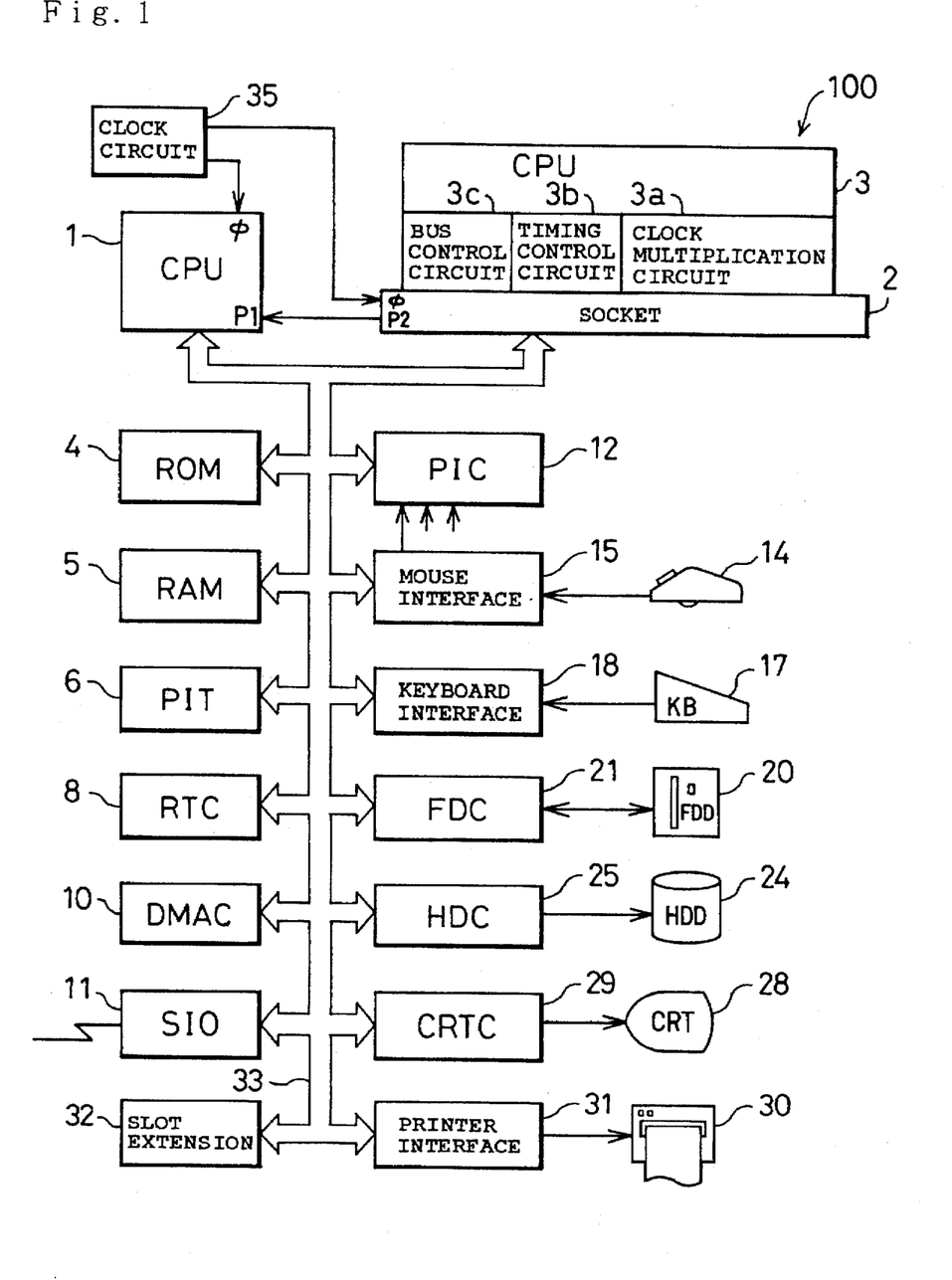
FIG. 1 is a block diagram showing an internal structure of a computer with an accelerator 100 embodying the invention.

FIG. 1 is a block diagram showing an internal structure of a personal computer generally driven and operated through a CPU 1. An accelerator 100 embodying the invention is inserted into a socket 2 for an arithmetic processor prepared on a motherboard.

Referring to FIG. 1, the computer includes a variety of circuits connected to one another via a bus 33 as well as the CPU 1 originally mounted on the motherboard. These elements are described briefly:

- a CPU 1: A central processing unit driven by a clock signal CLK having a clock frequency H1;
- a ROM 4: A mask memory for storing monitor programs and other programs;
- a RAM 5: a memory whose contents can be read or written on and which constitutes a main storage;
- a PIT 6: an interval timer for executing a timer interrupt;
- an RTC 8: a battery-backed up real time clock for counting the time;
- a DMAC 10: a controller for controlling direct memory access without intervention by the CPU 1;
- an SIO 11: a serial interface for controlling RS-232C communications;
- a PIC 12: an interrupt controller for assigning priorities to a variety of interrupts;
- a mouse interface 15: an interface for receiving and outputting data from and to a two-button mouse 14;
- a keyboard interface 18: an interface for receiving inputs from a keyboard 17;
- an FDC 21: a flexible disk controller for controlling a flexible disk drive (FDD) 20;
- an HDC 25: a hard disk controller for controlling a hard disk drive (HDD) 24;
- a CRTC 29: a CRT controller for controlling output of signals to a color CRT 28 which displays required data in color;
- a printer interface 31: an interface for controlling output of data to a printer 30; and
- a clock circuit 35: a logic circuit for generating the clock signal CLK of the clock frequency H1.

An extension slot 32 is further connected to the bus 33 for possible extension.

The CPU 1 has an input port p1, which connects with an output port P2 of the socket 2. When an arithmetic processor or the accelerator 100 is inserted into the socket 2, the output port P2 is internally grounded to output a signal of a low level. When the signal input into the input port P1 falls to the low level, the CPU 1 stops its operation and turns all its output connected to the bus 33 to high impedance. Namely, insertion of the accelerator 100 into the socket 2 leads the CPU 1 to stop its operation and a CPU 3 mounted on the accelerator 100 to start processing in place of the inactivated CPU 1. The CPU 3 on the accelerator 100 executes processing at a higher speed than the CPU 1, and is driven by a clock signal CLK15 having a clock frequency H2 (30 MHz) in this embodiment as described later.

Figure 2:
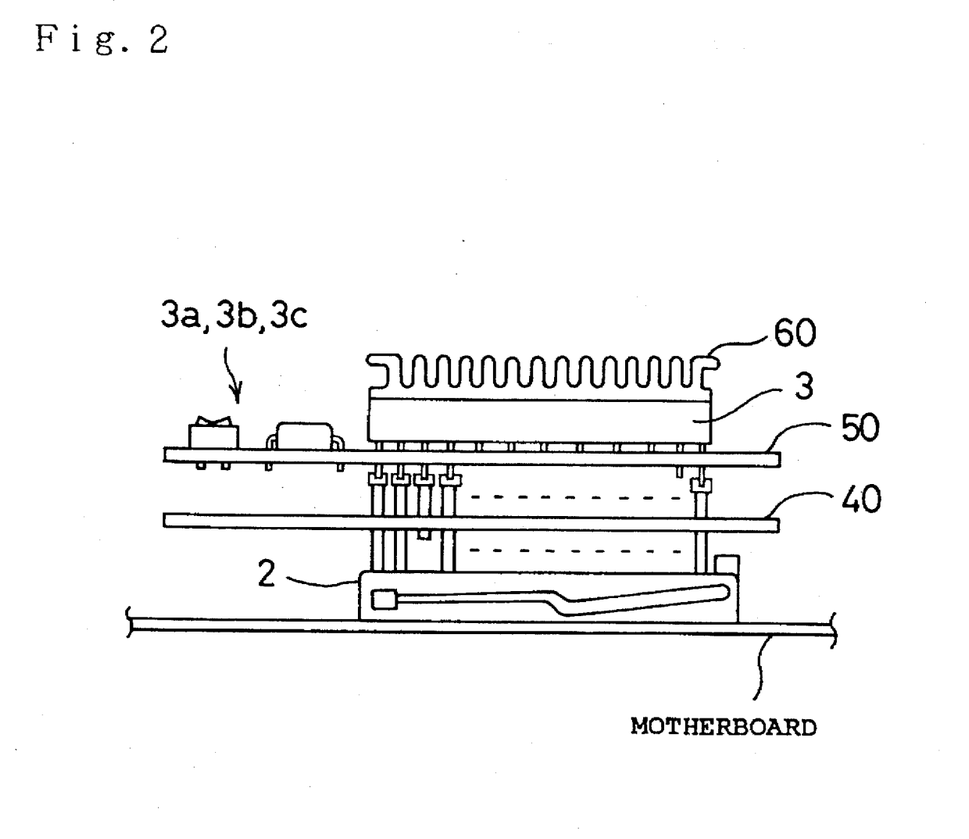
FIG. 2 is a front view illustrating the accelerator 100.

FIG. 2 is a front view illustrating the accelerator 100. The accelerator 100 includes a signal conversion board 40 having a plurality of terminal pins which are received by pins in the socket 2 originally prepared for an arithmetic processor on the motherboard, and a circuit board 50 which is disposed above the signal conversion board 40 and on which the CPU 3 and peripheral circuits are mounted. Since the high-speed CPU 3 is inserted into the socket 2 originally prepared for an arithmetic processor, the signal conversion board 40 works to compensate a slight difference (three pins in this embodiment) between a pin arrangement of the CPU 3 and that of the socket 2. In this embodiment, the socket 2 is for an i80487™ (manufactured by Intel Corporation) and the CPU 3 is an i80486DX2™-66 (manufactured by Intel Corporation).

The circuit board 50 mounts the CPU 3 as well as a PLA (programmable logic array), a digital delay line, a resistor, and a jumper wire constituting peripheral circuits described later. A radiation heat sink 60 is further attached to an upper face of the CPU 3.

As for the circuit structure, the accelerator 100 includes the high-speed CPU 3, a clock multiplication circuit 3a for converting a clock signal CLK of the clock frequency H1 to another clock signal CLK15 of the clock frequency H2, a timing control circuit 3b for controlling the timing of data exchange with other logic circuits like the ROM 4 and the RAM 5 driven by the clock signal CLK of the clock frequency H1, and a bus control circuit 3c having a control port, an address port, and a data port. These circuits are constructed by logic circuits shown in FIGS. 3 and 5.

Figure 3:
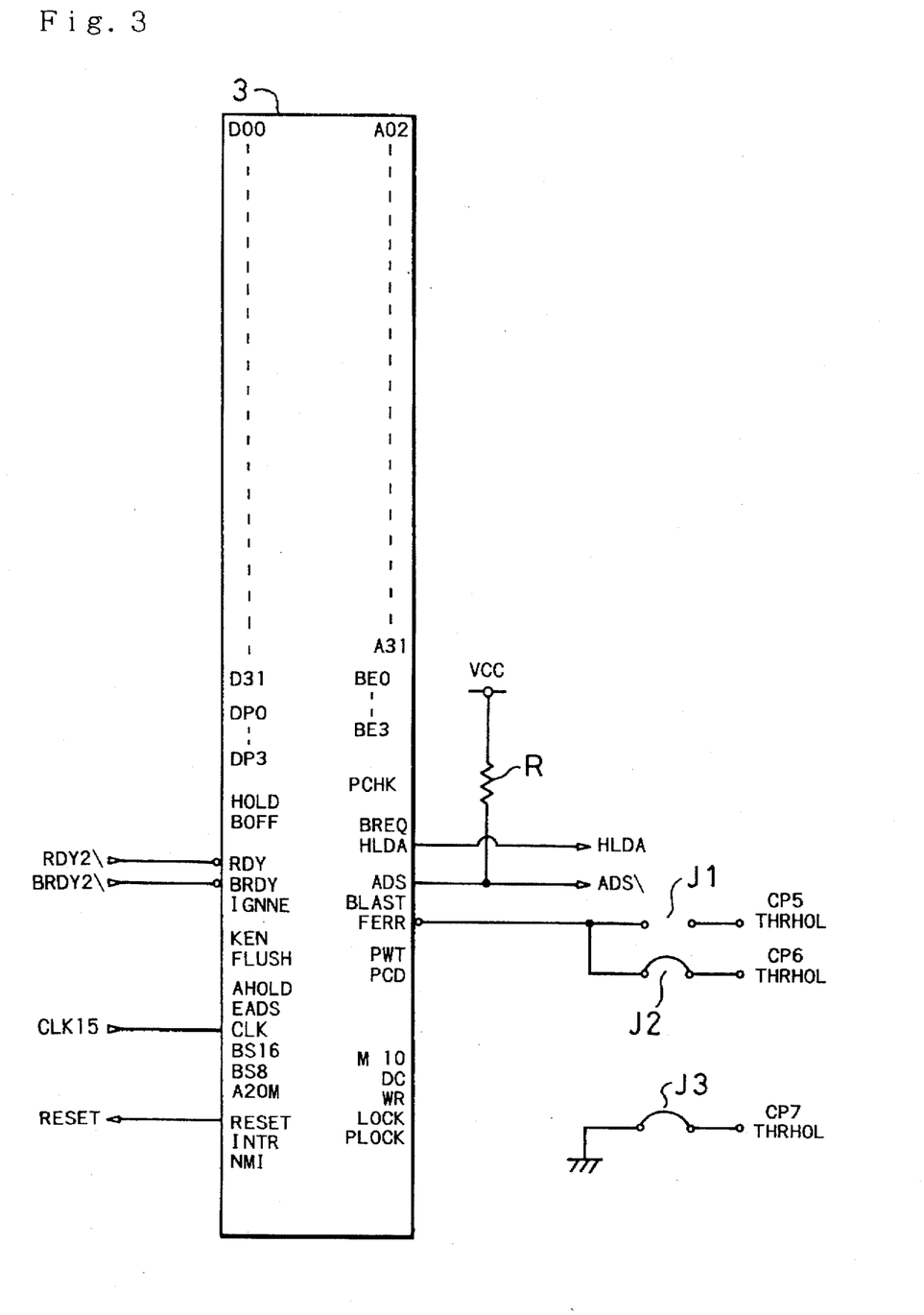
FIG. 3 is a circuit diagram showing a CPU 3 and peripheral circuits mounted on the accelerator 100.
Figure 4:
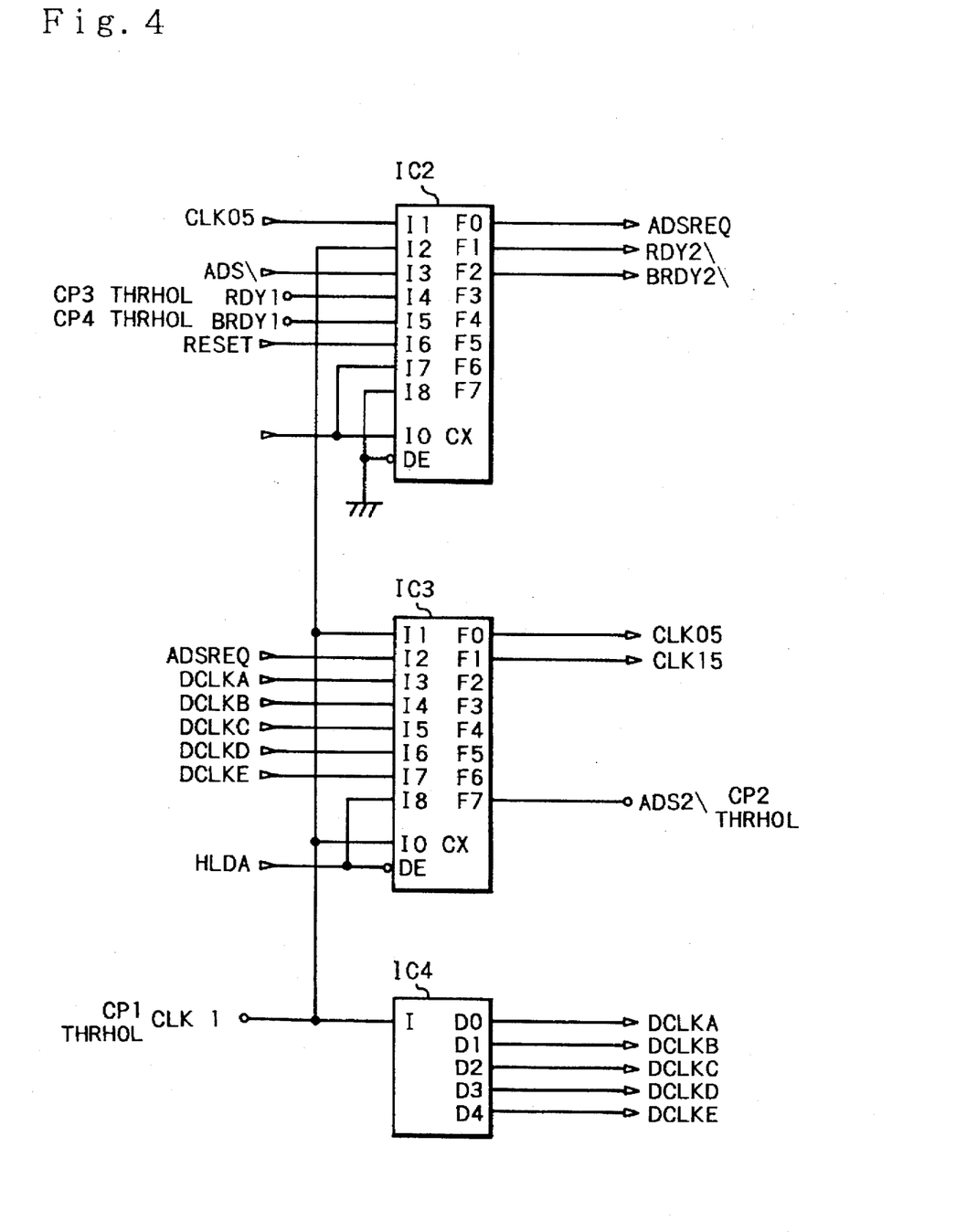
FIG. 4 is a circuit diagram showing a clock multiplication circuit 3a and a timing control circuit 3b of the accelerator 100.

FIG. 3 shows the CPU 3 working as the center of the logic circuits of the accelerator 100 and control signals related to the CPU 3. In this embodiment, a 486DX2™-66 (manufactured by Intel Corporation) having an upper limit of an internal operation frequency at 66 MHz is used for the CPU 3. The CPU 3 is a double-speed CPU internally acting at a frequency twice as high as a frequency of a clock signal supplied externally. For example, when 30 MHz clock signal is supplied to the CPU 3, it works by 60 MHz clock signal internally. Most input/output pins of the CPU 3 are directly connected to the corresponding signal lines of the bus 33 on the motherboard via the socket 2. Signals converted to different signals or transmitted through different signal lines on the circuit board 50 include an address control signal ADS\ for informing confirmation of a signal on an address bus, a bus hold acknowledge signal HLDA, a ready signal RDY\ representing completion of a bus cycle in a non-burst mode, a burst mode ready signal BRDY\ representing completion of a bus cycle in a burst mode, an error signal FERR\ showing an error in floating-point arithmetic, the clock signal CLK functioning as a standard of processor operations, and a reset signal RESET for resetting the processor. The symbol \ affixed to the signal name represents that the signal is low active. In the drawings of FIGS. 3 and 4, 'CPn THRHOL' represents connection with a joint terminal (through hole) to the signal conversion board 40.

FIG. 4 is a circuit diagram showing the clock multiplication circuit 3a and the timing control circuit 3b of the accelerator 100. In this embodiment, the clock frequencies HI and H2 are respectively set equal to 20 MHz and 30 MHz. One cycle of the clock signal CLK having the clock frequency H1 is accordingly equal to 50 ns; 25 ns for a high level and 25 ns for a low level.

The clock multiplication circuit 3a of the accelerator 100 includes an IC3 and an IC4, the latter of which stores a digital delay line and receives the clock signal CLK at each input pert I.

The IC4 receives the clock signal CLK at the input port I, and outputs signals DCLKA through DCLKE, each having a phase delayed by a predetermined time period, from output ports D0 through D4. When the phase difference of each signal output from the IC4 is expressed as a delay time from the clock signal CLK, the signals output from the output port D0 through D4 respectively have delays of 5 ns, 10 ns, 15 ns, 20 ns, and 25 ns.

The signals DCLKA through DCLKE thus generated have the same waveform as the clock signal CLK and delayed from the clock signal CLK by 5 ns, 10 ns, 15 ns, 20 ns, and 25 ns, respectively. These clock signals DCLKA through DCLKE are input into the corresponding input terminals of the IC3.

Figure 5A:
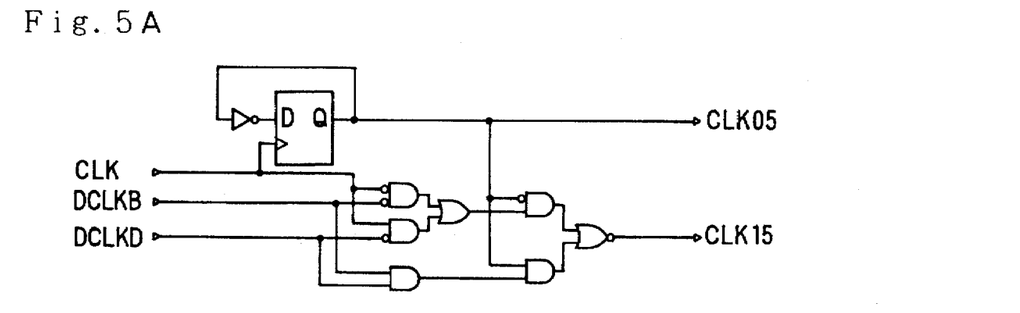
FIGS. 5A, 5B and 5C are logic circuit diagrams showing equivalent circuits of the clock multiplication circuit 3a and the timing control circuit 3b.
Figure 5B:
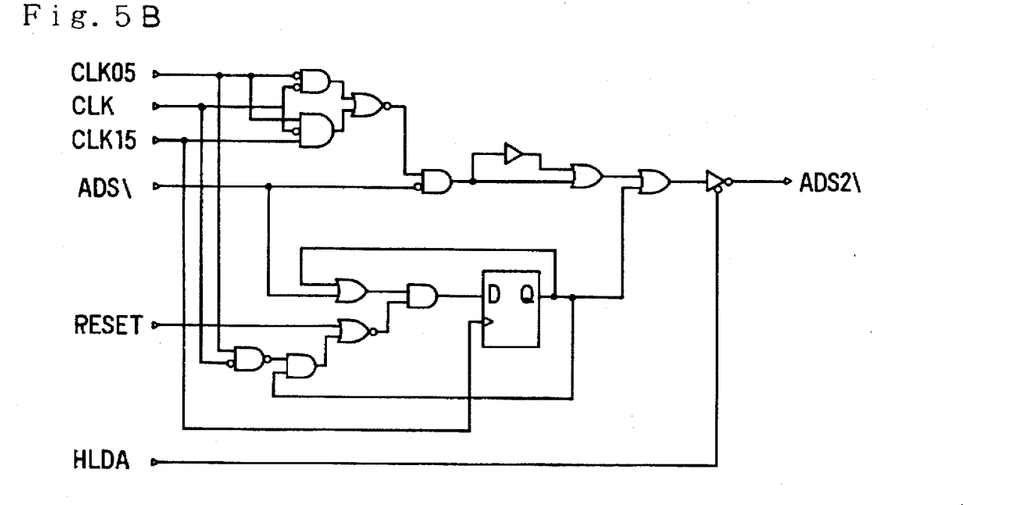
Figure 5C:
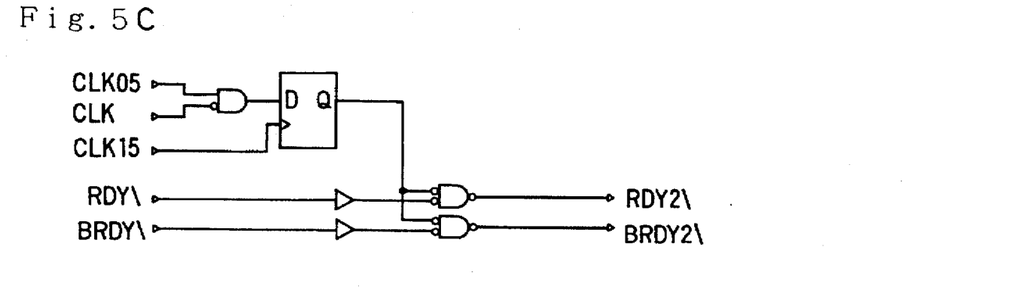

Both IC2 and IC3 are programmable logic arrays (PLA) having D-type flip flops, which receive a plurality of input signals and generate a desirable output according to the AND-OR logic. In this embodiment, the IC3 divides the frequency of the clock signal CLK to generate a clock signal CLK05 of a half frequency, and receives the clock signals DCLKA through DCLKE output from the IC4 to generate the clock signal CLK15. FIGS. 5A through 5C show equivalent circuits realized by the IC2 and IC3.

Figure 6:
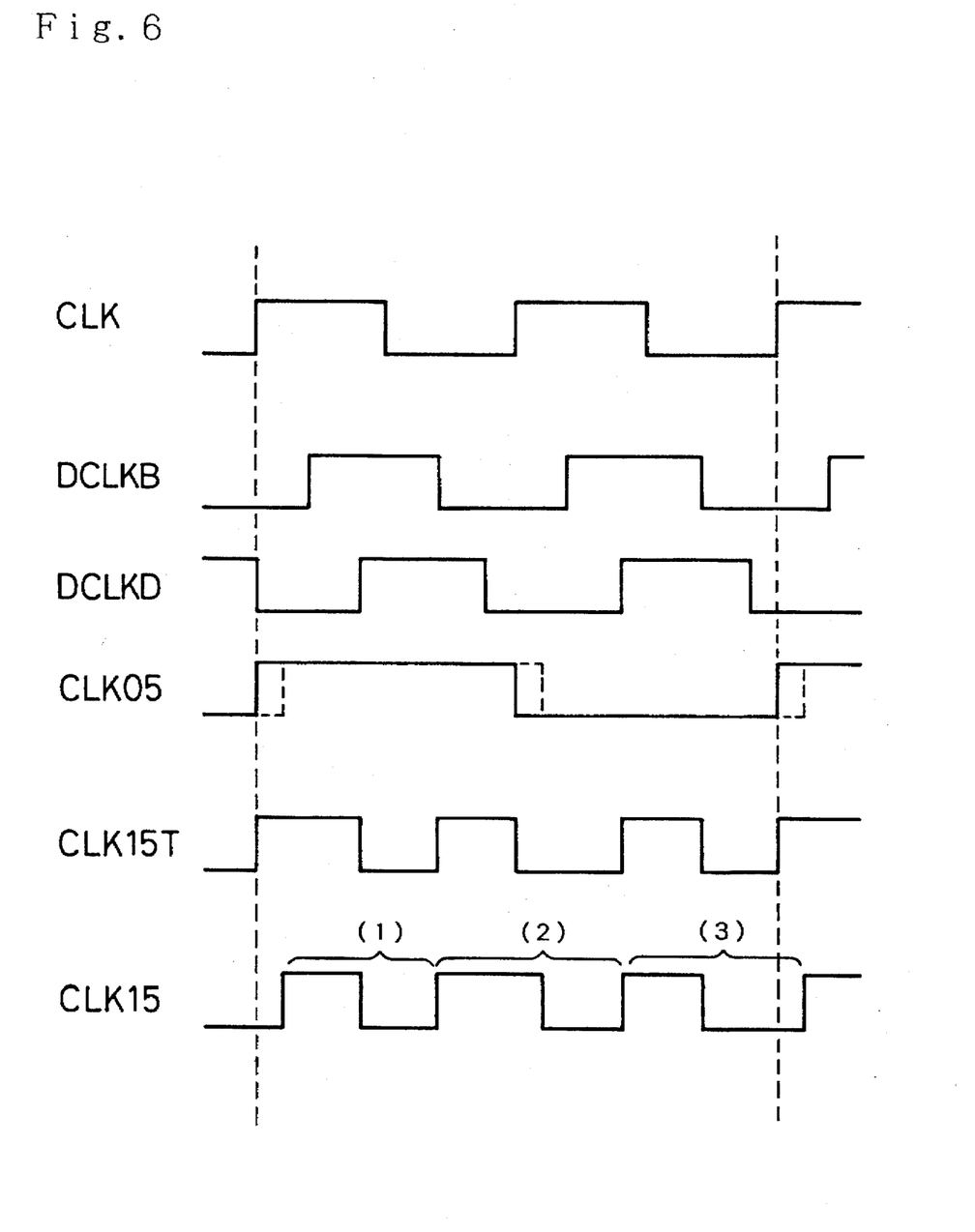

A typical structure of the clock multiplication circuit 3a is described first. Referring to FIG. 5A, the clock signal CLK05 is generated by a circuit which inverts an output of the D-type flip flop driven by the clock signal CLK and inputs the inverted output to data D. The clock signal CLK15 is, on the other hand, generated in response to the clock signals CLK, DCLKB, DCLKD, and CLK05. Waveforms of the respective clock signals are shown in FIG. 6. Provided that no delay is observed in a latch circuit, an AND gate, or an OR gate shown in FIG. 5A, a clock signal CLK15T shown in FIG. 6 is generated. In actual operation, however, since at least a small delay exists at each gate (a relatively large delay for the D-type flip flop), the clock signal CLK05 and the clock signal CLK15 thus generated have waveforms shown by a broken line and a solid line in FIG. 6, respectively. The clock signal CLK15 has the frequency of 30 MHz, where three cycles of the clock signal CLK15 substantially correspond to two cycles of the clock signal CLK generated from the motherboard. Namely, the clock signal CLK15 has the frequency of 1.5 times the frequency of the clock signal CLK.

The timing control circuit 3b of the accelerator 100 is also constructed by the IC2 and IC3. FIGS. 5B and 5C show equivalent circuits realized by the IC2 and IC3 as combinations of logic gates. The timing control circuit 3b works in the following manner to synchronize operation of the motherboard driven by the clock signal CLK with operation of the CPU 3 driven by the clock signal CLK15 which is 1.5 times the clock signal CLK. The timing control circuit 3b generates an address strobe signal ADS2\ output from the CPU 3 to the motherboard as well as a ready signal RDY2\ for informing the CPU 3 of completion of a bus cycle in a non-burst mode and a burst ready signal BRDY2\ for informing the CPU 3 of completion of a bus cycle in a burst mode.

Figure 7:
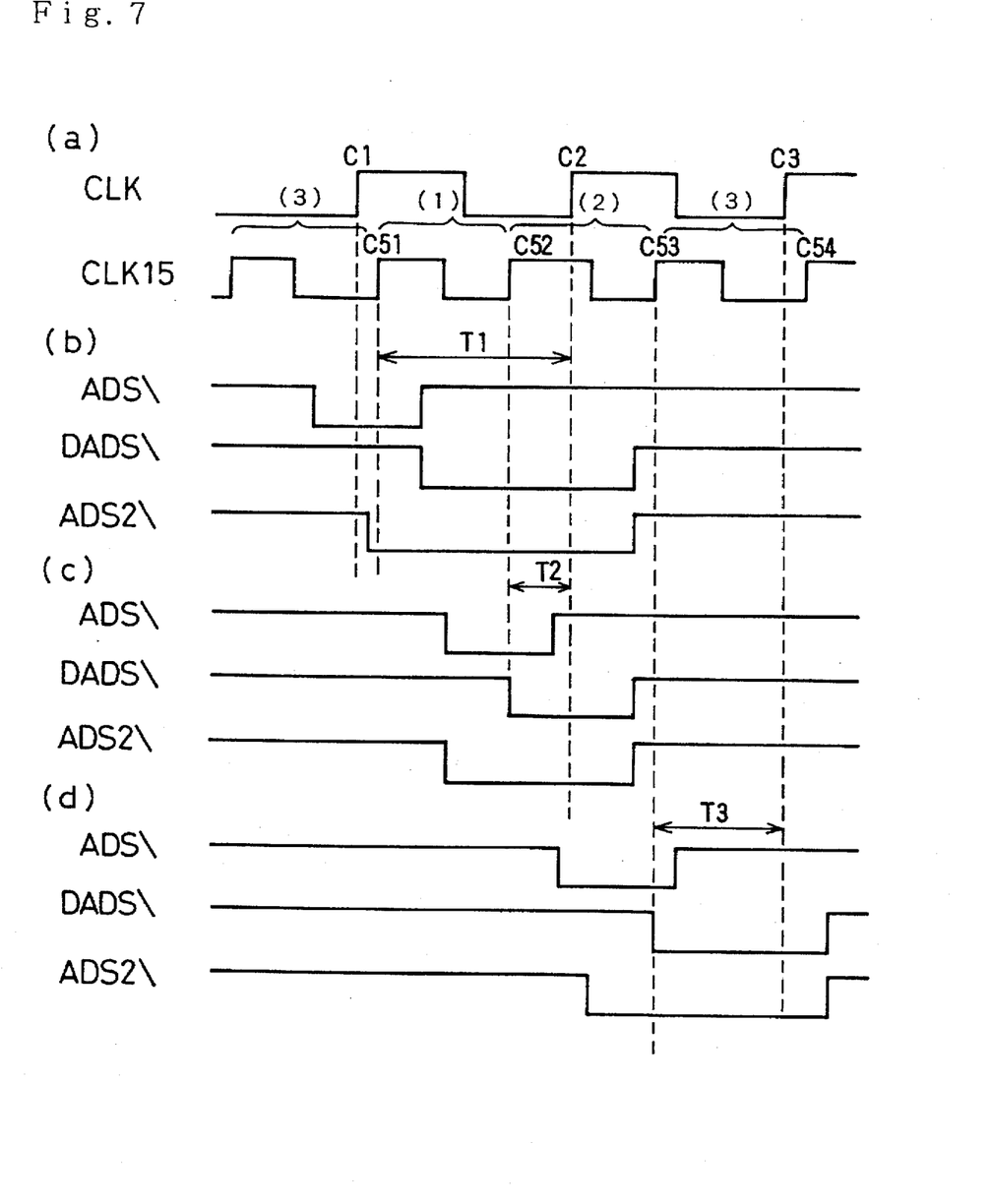
FIG. 7 is a timing chart showing the timing of each element in address strobe signal generating circuit.

The address strobe signal ADS2\ informs the motherboard of the timing of inputting data on the address bus during access of the CPU 3 to the ROM 4 or the RAM 5 on the motherboard. The address control signal ADS\ is output from the CPU 3 synchronously with the high-speed clock signal CLK15 as shown in FIG. 7. The ROM 4 and the RAM 5 on the motherboard working synchronously with the clock signal CLK confirm a signal on the address bus at a first rise of the clock signal CLK since the address strobe signal has become low active, and determine an address for the access. Direct output of the address control signal ADS\ from the CPU 3 to the motherboard can not make operation of the motherboard synchronous with operation of the CPU 3.

The timing control circuit 3b thus drives the logic circuit shown in FIG. 5B to generate the address strobe signal ADS2\ in response to the address control signal ADS\ output from the CPU 3 and output the address strobe signal ADS2\ to the ROM 4, the RAM 5, and other circuits on the motherboard driven by the clock signal CLK. The clock signal CLK15 on the CPU 3 and the clock signal CLK on the motherboard have an identical phase relationship at every two cycles of the clock signal CLK. The address strobe signals ADS2\ having different timings are thereby generated for the three cycles of the clock signal CLK15.

As shown in FIG. 5B, the address strobe signal ADS2\ is generated from the clock signals CLK, CLK05, and CLK15, the address control signal ADS\, the reset signal RESET, and the bus hold acknowledge signal HLDA. Since the bus hold acknowledge signal HLDA makes a final gate of the address strobe signal ADS2\ inhibitable, the address strobe signal ADS2\ can enter a high impedance condition, like the address port of the CPU 3, when the CPU 3 receives a requirement from another bus master to assign the right of exclusive use of the bus. Except this condition, the circuit of FIG. 5B is determined according to the relationships between the address control signal ADS\, the address strobe signal ADS2\, and the clock signals CLK and CLK15. The circuit of FIG. 5B is thus described based on the timing of each signal.

For clarifying the relationship between the clock signals CLK and CLK15, three cycles of the clock signal CLK15 obtained after the input of a first clock signal CLK into the delay line IC4 are respectively referred to as the cycle (1), the cycle (2), and the cycle (3) as shown in the bottom of FIG. 6. Completion of the three cycles (1), (2), and (3) of the clock signal CLK15 is accomplished simultaneously with completion of two cycles of the clock signal CLK. There are three, and only three different patterns in the phase relationship between the clock signals CLK15 and CLK, which respectively correspond to the cycles (1), (2), and (3).

In the timing chart of FIG. 7, when a bus cycle starts in the cycle (3), the CPU 3 determines an address at a first rise C51 of the clock signal CLK15. When the address control signal ADS\ is output directly to the motherboard, however, the ROM 4 and the RAM 5 on the motherboard read the address at a first rise C1 of the clock signal CLK, when the address has not been determined yet. As shown in FIGS. 7(a) and 7(b), the logic circuit of FIG. 5B makes the start of the address strobe signal ADS2\ output to the motherboard immediately after the first rise C1 of the clock signal CLK, and thereby delays the end of the address strobe signal ADS2\ to a next rise C2 of the clock signal CLK.

Figure 8:
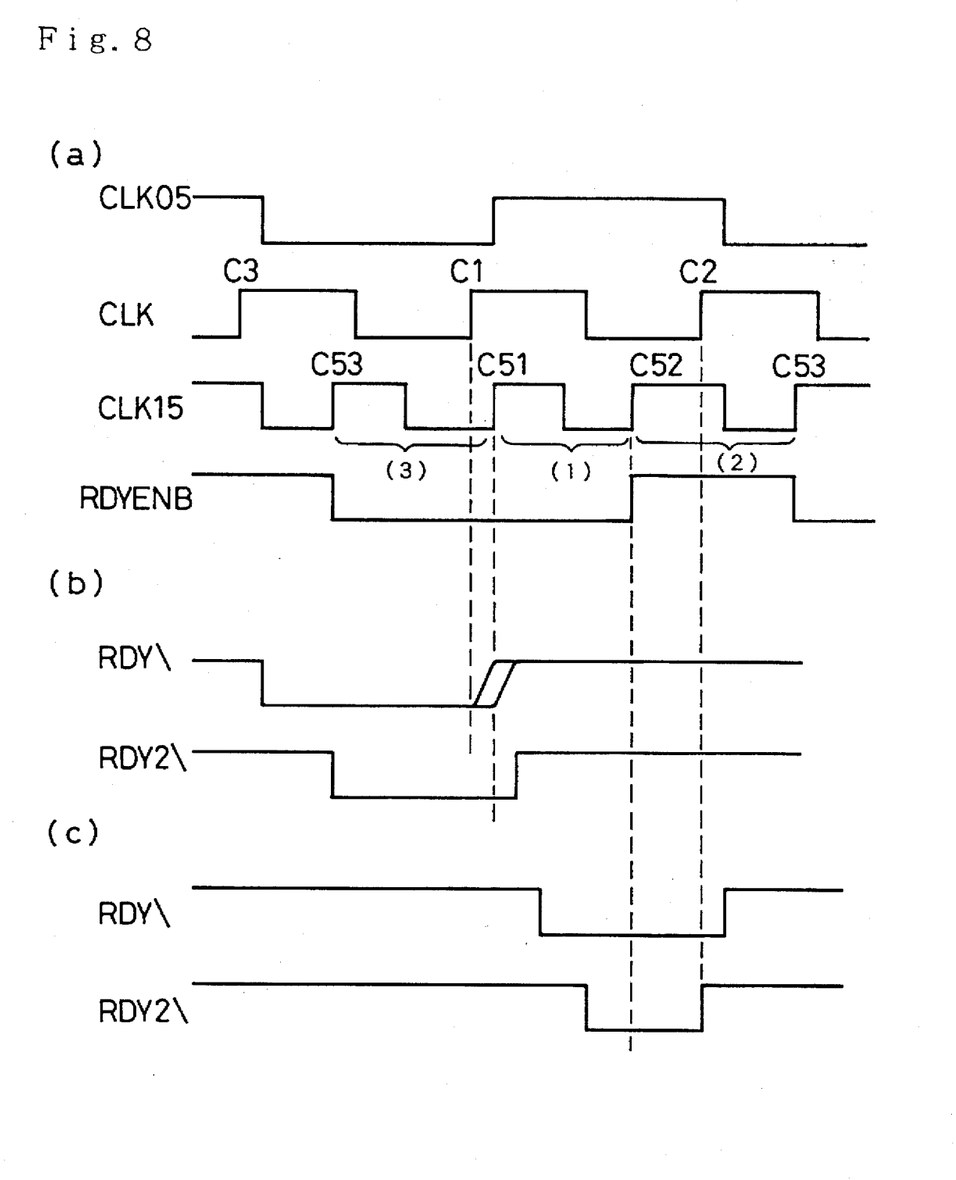
FIG. 8 is a timing chart of ready signals.

The CPU 3 continues outputting the address from the address port during a wait time T1 between the first rise C51 of the clock signal CLK15 and the second rise C2 of the clock signal CLK. The ready signal RDY\ for informing the CPU 3 of completion of the bus cycle is also adjusted to be a ready signal RDY2\ as shown in FIG. 8.

When a bus cycle starts in the cycle (1), on the other hand, the CPU 3 determines an address at a next rise C52 of the clock signal CLK15. In such a case, no problems arise when the ROM 4 and the RAM 5 on the motherboard read the address at the second rise C2 of the clock signal CLK. The logic circuit of FIG. 5B thus makes the address strobe signal ADS2\ low active simultaneously with a fall of the address control signal ADS\ and continues the low active address strobe signal ADS2\ to the next rise C2 of the clock signal CLK as shown in FIG. 7(c). In this case, the wait time is T2 between the second rise C52 of the clock signal CLK15 and the second rise C2 of the clock signal CLK.

When a bus cycle starts in the cycle (2), the CPU 3 determines an address at a third rise C53 of the clock signal CLK15 whereas the ROM 4 and the RAM 5 on the motherboard read the address at a third rise C3 of the clock signal CLK. The logic circuit of FIG. 5B thus starts the address strobe signal ADS2\ immediately after the address control signal ADS\ becomes low active, and continues the low active address strobe signal ADS2\ to the third rise C3 of the clock signal CLK as shown in FIG. 7(d). In this case, the wait time is T3 between the third rise C53 of the clock signal CLK15 and the third rise C3 of the clock signal C3.

The timing of the control signal output to the ROM 4, the RAM 5, and other logic circuits on the motherboard driven by the clock signal CLK is limited to the three patterns described above since the clock frequency H2 of the clock signal CLK15 is 1.5 times the frequency H1 of the clock signal CLK. Output of the address strobe signal to the motherboard is thus varied according to the position where a bus cycle starts in the phase relationship between the two clock signals CLK15 and CLK. Addresses, data, and other signals output from the output port of the CPU 3 are accordingly recognized securely by the logic circuit on the motherboard driven by the clock signal CLK.

The bus cycle of the CPU 3 should be extended in response to the output of the address strobe signal. The ready signal RDY\ for informing completion of a bus cycle in the non-burst mode or the burst ready signal BRDY\ for informing completion of a bus cycle in the burst mode are thereby replaced respectively by a ready signal RDY2\ and a burst ready signal BRDY2\ as shown in FIG. 8. The logic circuit of FIG. 5C implements this conversion. More concretely, the circuit of FIG. 5C generates the ready signals RDY2\ and the BRDY2\ from the ready signals RDY\ and BRDY\ output from the motherboard and the clock signals CLK and CLK15. The CPU 3 receives the ready signals RDY2\ and the BRDY2\ at the corresponding terminals as shown in FIG. 3.

The accelerator 100 of the embodiment drives the CPU 3 by the clock signal CLK15 having the frequency 1.5 times the frequency of the clock signal CLK on the motherboard. This realizes high-speed processing of the computer even when the maximum frequency of the CPU 3 on the accelerator 100 is not an integral multiple of the clock frequency on the motherboard. Since the CPU 3 is a double-speed CPU in this embodiment, the actual operation speed is equal to 60 MHz (=20×1.5×2), which is three times the speed 20 MHz of the CPU 1.

In this embodiment, three jumper wires J1, J2, and J3 are mounted on the circuit bard 50 to be applicable to the insertion of the accelerator 100 into the socket 2 for an arithmetic processor as well as the replacement of the accelerator 100 for the CPU 1. When the accelerator 100 is replaced for the CPU 1, the accelerator 100 is mounted directly on the socket for the CPU 1 by connecting the jumper wire J1 instead of the jumper wires J2 and J3 and removing the signal conversion board 40.

There may be many modifications, alternations, and changes without departing from the scope or spirit of essential characteristics of the invention. It is thus clearly understood that the above embodiment is only illustrative and not restrictive in any sense. The principle of the invention is applicable to other structures: for example, a structure where the frequency of the clock signal is multiplied by another non-integral value like 2.5 times; a structure where the timing control circuit 3b is realized by a gate array; a structure where the clock multiplication circuit 3a is realized by a PLL circuit; and a structure where the CPU on the accelerator is not a double-speed CPU but a standard CPU having the operation speed of 60 MHz and the CPU on the motherboard has the operation speed of 40 MHz.

The scope and spirit of the present invention are limited only by the terms of the appended claims.

What is claimed:

1. An accelerator for use in mounting and interfacing a second CPU which functionally replaces a first CPU on a motherboard, said first CPU intended to be driven by a first clock signal having a first period and a first frequency, said accelerator comprising:

mounting means for mounting said second CPU on said motherboard;

clock signal output means for generating a second clock signal from said first clock signal, said clock signal output means being operative to generate a plurality of delayed signals that take the form of a series of consecutively delayed waveform copies of said first clock signal wherein each copy is delayed by a corresponding time period that is less than or equal to one-half of said first period, said clock signal output means being further operative to combine said plurality of delayed signals to generate said second clock signal, wherein the second clock signal has a second frequency that is a non-integral multiple of said first frequency, said clock signal output means also being operative to output said second clock signal to said second CPU; and timing signal generating means for generating a timing signal for access of said second CPU in response to an address control signal generated by said second CPU and a synchronous combination of said first clock signal and said second clock signal, whereby said first clock signal and said second clock signal will automatically synchronize at said synchronous combination without further adjustment.

2. An accelerator in accordance with claim 1, wherein said second frequency is 1.5 times said first frequency.

3. An accelerator in accordance with claim 1, wherein said second CPU comprises a double-speed CPU having an internal operation clock running at a frequency 2 times said second frequency.

4. An accelerator in accordance with claim 1, wherein said mounting means is arranged for converting a pin arrangement of said second CPU to a pin arrangement of a co-processor of said first CPU, whereby said second CPU may be mounted on said accelerator and said accelerator may be inserted into a co-processor socket present on said motherboard which is arranged to accept said co-processor.

5. An accelerator in accordance with claim 1, wherein said mounting means is arranged for converting a pin arrangement of said second CPU to a pin arrangement of said first CPU, whereby said second CPU may be mounted on said accelerator and said accelerator may be inserted into a first CPU socket present on said mother board which is arranged to accept said first CPU.

6. An accelerator in accordance with claim 1 further comprising:

data reading and writing means for reading and writing data while synchronizing with said second clock signal, said data reading and writing means reading and writing data in a read/write cycle based on said second clock signal after read/write based on said first clock signal becomes possible.

7. An accelerator for use in mounting and interfacing a second CPU which functionally replaces a first CPU on a mother board, said accelerator comprising:

mounting means for mounting said second CPU on said motherboard;

clock signal output means for generating a second clock signal from a first clock signal intended for said first CPU, said first clock signal having a first frequency, said second clock signal having a second frequency being a non-integral multiple of said first frequency, wherein said first clock signal and said second clock signal have a finite number of combinations being equal to a lowest common multiple of said first frequency and said second frequency; and timing signal generating means for generating a timing signal for said second CPU to read a memory in response to an address control signal generated by said second CPU and a present combination of said first clock signal and said second clock signal, said timing signal being generated as a function of the present combination of said first clock signal and said second clock signal such that the time necessary for reading said memory by said second CPU is minimized.

8. An accelerator in accordance with claim 7, wherein said second frequency is 1.5 times said first frequency and thus said lowest common multiple of said first frequency and said second frequency is 3.

9. An accelerator in accordance with claim 7, wherein said second CPU comprises a double-speed CPU having an internal operation clock running at a frequency 2 times said second frequency.

10. An accelerator in accordance with claim 7, wherein said mounting means is arranged for converting a pin arrangement of said second CPU to a pin arrangement of a co-processor of said first CPU, whereby said second CPU may be mounted on said accelerator and said accelerator may be inserted into a co-processor socket present on said motherboard which is arranged to accept said co-processor.

11. An accelerator in accordance with claim 7, wherein said mounting means is arranged for converting a pin arrangement of said second CPU to a pin arrangement of said first CPU, whereby said second CPU may be mounted on said accelerator and said accelerator may be inserted into a first CPU socket present on said mother board which is arranged to accept said first CPU.

12. An accelerator in accordance with claim 7, wherein said memory is selected from the group including read only memory (ROM) and random access memory (RAM).

13. An accelerator in accordance with claim 7 further comprising:

data reading and writing means for reading and writing data while synchronizing with said second clock signal, said data reading and writing means reading and writing data in a read/write cycle based on said second signal after read/write based on said first clock signal becomes possible.

* * * * *